United States Patent
Kim et al.

(10) Patent No.: US 11,748,867 B2
(45) Date of Patent: Sep. 5, 2023

(54) APPARATUS AND METHOD FOR SECONDARY BATTERY APPEARANCE INSPECTION

(71) Applicant: ENSCAPE CO., LTD., Seongnam (KR)

(72) Inventors: Nam Dong Kim, Suwon (KR); Sang Sik Min, Hwaseong (KR); Won Young Jeong, Suwon (KR); Yong Deong Kang, Seongnam (KR)

(73) Assignee: ENSCAPE CO., LTD., Seongnam (KR)

( * ) Notice: Subject to any disclaimer, the term of this patent is extended or adjusted under 35 U.S.C. 154(b) by 0 days.

(21) Appl. No.: 17/567,783

(22) Filed: Jan. 3, 2022

(65) Prior Publication Data
US 2022/0245784 A1   Aug. 4, 2022

(30) Foreign Application Priority Data

Feb. 3, 2021  (KR) ........................ 10-2021-0015422

(51) Int. Cl.
*G06T 7/00* (2017.01)
*B25J 9/16* (2006.01)
*H04N 23/74* (2023.01)

(52) U.S. Cl.
CPC ........... *G06T 7/0004* (2013.01); *B25J 9/1697* (2013.01); *H04N 23/74* (2023.01); *G06T 2207/10152* (2013.01); *G06T 2207/20021* (2013.01); *G06T 2207/20212* (2013.01)

(58) Field of Classification Search
CPC ... G06T 7/0004; G06T 7/0006; G06T 7/0008; G06T 2207/10152; G06T 2207/20212; B25J 9/1697; H04N 5/2354
See application file for complete search history.

(56) References Cited

U.S. PATENT DOCUMENTS

| | | | |
|---|---|---|---|
| 2012/0133371 A1* | 5/2012 | Toomre | H01M 50/227 29/730 |
| 2012/0181449 A1* | 7/2012 | Kenton | H01M 6/5083 250/200 |
| 2013/0113916 A1* | 5/2013 | Scheid | G06T 7/0004 348/E7.085 |
| 2019/0236770 A1* | 8/2019 | Sugita | G06T 3/4038 |
| 2020/0064277 A1* | 2/2020 | Hucker | G01N 21/8851 |
| 2021/0027453 A1* | 1/2021 | Lin | G06T 5/003 |
| 2021/0184280 A1* | 6/2021 | Kim | H01M 10/4285 |
| 2021/0302324 A1* | 9/2021 | Yoon | G01N 21/95 |
| 2021/0366101 A1* | 11/2021 | George Boehm, Jr. | D06P 5/30 |

(Continued)

FOREIGN PATENT DOCUMENTS

| | | | | |
|---|---|---|---|---|
| CN | 109146841 A | * | 1/2019 | ........... G06T 7/0004 |
| CN | 109598721 B | * | 8/2021 | ......... G01N 21/8851 |

(Continued)

*Primary Examiner* — Michael Robert Cammarata

(57) ABSTRACT

Disclosed are an apparatus and method for inspecting appearance of secondary batteries, in which a plurality of secondary batteries arranged in a lateral direction are rotated at a time, a photographed image obtained by a camera according to rotated angles is divided into individual image sections where the secondary batteries are respectively photographed, and an inspection image is generated by combining the individual image sections according to the photographed images of one secondary battery.

13 Claims, 20 Drawing Sheets

(56) References Cited

U.S. PATENT DOCUMENTS

2021/0390684 A1* 12/2021 Nakashima ........... G06T 7/0004
2022/0375056 A1* 11/2022 Weiss ........................ G06T 7/60

FOREIGN PATENT DOCUMENTS

| | | | | |
|---|---|---|---|---|
| EP | 4106077 | A1 | * | 12/2022 |
| JP | 2017173048 | A | * | 9/2017 |
| JP | 2018091693 | A | * | 6/2018 |
| JP | 20180076466 | A | * | 7/2018 |
| JP | 2022012629 | A | * | 1/2022 |
| KR | 10-2011-0018080 | A | | 2/2011 |
| KR | 20110018081 | A | * | 2/2011 |
| KR | 10-2011-0090452 | A | | 8/2011 |
| KR | 101030449 | B1 | | 4/2021 |
| KR | 102331861 | B1 | * | 12/2021 |
| KR | 20220111980 | A | * | 8/2022 |
| WO | WO-2022154360 | A1 | * | 7/2022 |

\* cited by examiner

FIG. 13
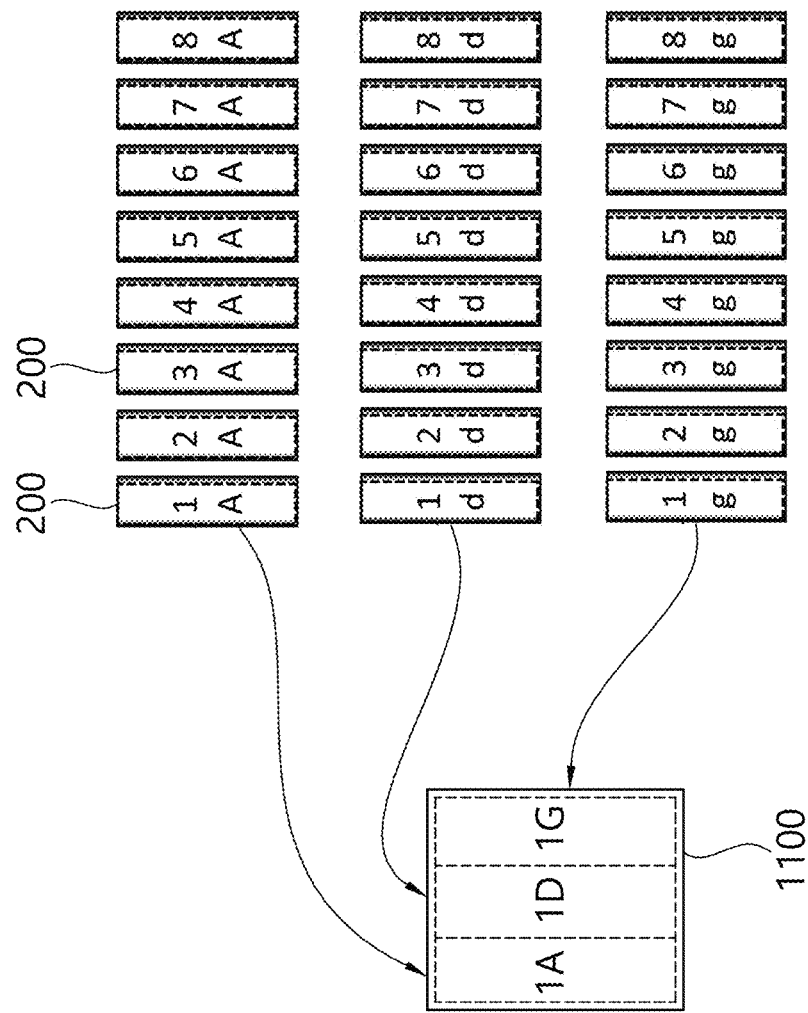
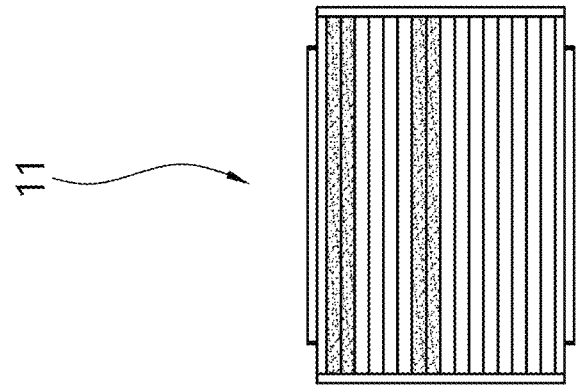

FIG. 17A
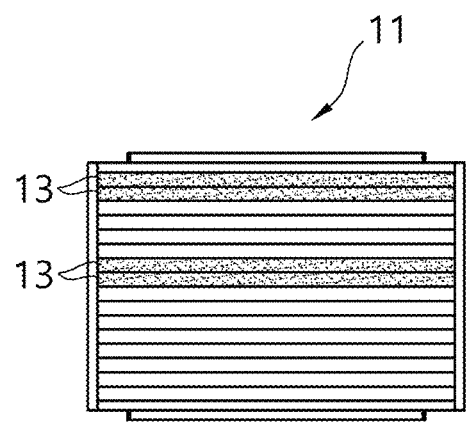
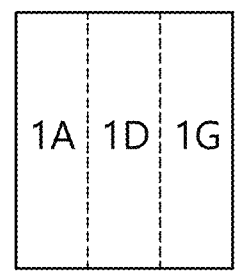

FIG. 17B
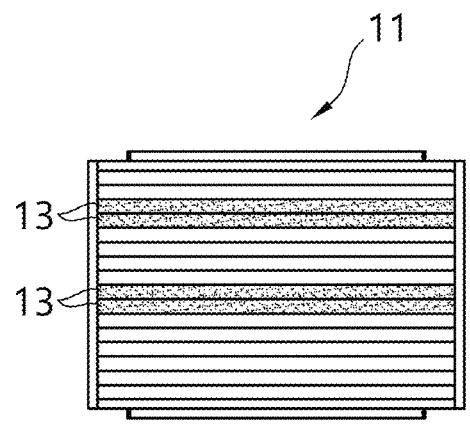
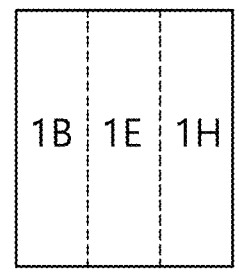

FIG. 17C
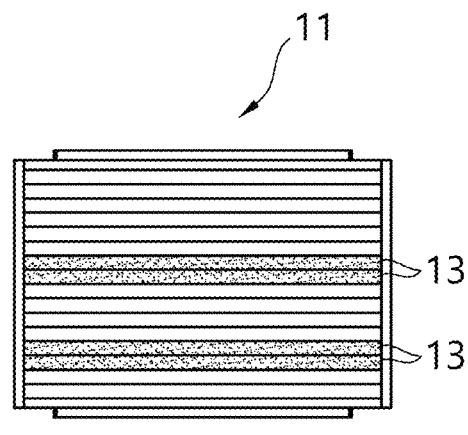
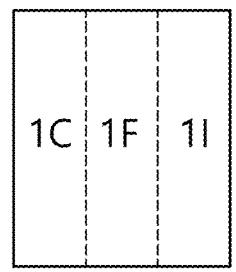

APPARATUS AND METHOD FOR SECONDARY BATTERY APPEARANCE INSPECTION

CROSS-REFERENCE TO RELATED APPLICATIONS

Pursuant to 35 U.S.C. § 119 (a), this application claims the benefit of Korean Patent Application No. 10-2021-0015422, filed on Feb. 3, 2021, the contents of which are all hereby incorporated by reference herein in their entirety.

BACKGROUND

Field

The disclosure relates to an apparatus for inspecting the appearance of a secondary battery and a method of inspecting the appearance of a secondary battery, and more particularly to an apparatus and method for inspecting a lateral surface of the appearance of a cylindrical secondary battery.

Description of the Related Art

A secondary battery refers to a battery that supplies power to the outside by converting chemical energy into electric energy and stores chemical energy converted from electric energy by receiving power from the outside when it runs down. With development of electronic devices, the secondary batteries are being applied to various devices in various fields.

Such secondary batteries have been produced in various forms. As one of the various forms, a cylindrical form a conventional battery generally has is still widely used.

A cylindrical secondary battery is shaped like a cylinder having a curved lateral surface, and thus generally undergoes appearance inspection while being rotated 360 degrees.

An appearance inspection apparatus for the cylindrical secondary battery has been disclosed in Korean Patent No. 1030449 (published on Apr. 25, 2011).

However, such a conventional method of inspecting the lateral surface of the battery has a problem that an inspection efficiency is low because one or two cameras are used in inspecting one battery.

SUMMARY

An aspect of the disclosure is to provide an apparatus and method for inspecting the appearance of a secondary battery, which can solve the foregoing problem of a low inspection efficiency the conventional apparatus for inspecting the appearance of a cylindrical secondary battery has.

According to an embodiment, there may be provided An apparatus for inspecting appearance of a secondary battery, the apparatus including: a hand configured to simultaneously rotate a plurality of secondary batteries arranged in a lateral direction; an illuminator configured to emit light to the plurality of secondary batteries at a time; a camera configured to simultaneously obtain a photographed image of the plurality of secondary batteries to which the light is emitted; and an image processor configured to obtain an inspection image by processing the image obtained by the camera, wherein the image processor divides the photographed image obtained by the camera into individual image sections where the secondary batteries are respectively photographed, and the inspection image is generated by combining the individual image sections according to the photographed images of one secondary battery.

Meanwhile, the illuminator may include a plurality of light emitting units configured to emit light at different positions, and the image processor may obtain at least two inspection images obtained by emitting light from different light emitting units among the plurality of light emitting units.

Further, the apparatus may further include a controller configured to control the illuminator, the camera, and the hand, wherein the controller controls the photographing of the camera and the light emission of the illuminator to be synchronized.

Further, the controller may be configured to control the light emitting units of the illuminator, which are disposed at different positions along a lengthwise direction of a secondary battery picked up by the hand, to operate in sequence.

Meanwhile, the controller may be configured to simultaneously operate the light emitting units disposed in a direction perpendicular to the lengthwise direction, and perform control to select the light emitting units operating in sequence along the lengthwise direction.

Further, the controller may be configured to: simultaneously operate the plurality of light emitting units disposed along a pair of straight lines spaced apart from each other and perpendicular to the lengthwise direction, and control the operating light emitting units to be switched along the lengthwise direction.

Further, the illuminator may be disposed to emit light obliquely with respect to an arrangement direction in which a predetermined number of picked-up secondary batteries are arranged.

Meanwhile, the camera may include an optical axis perpendicular to the arrangement direction in which the predetermined number of picked-up secondary batteries are arranged.

Meanwhile, the hand may be configured to pick up and move a predetermined number of secondary batteries in a lengthwise direction from a loader, in which the plurality of secondary batteries are loaded, to an inspection position.

Further, the image processor may be configured to identify whether appearance is defective based on at least one of brightness and contrast in the plurality of inspection images.

In addition, there may be provided a method of inspecting appearance of a secondary battery, the method including: by a hand, picking up a predetermined number of secondary batteries arranged in a row from a loader in which a plurality of secondary batteries are loaded; simultaneously rotating the predetermined number of secondary batteries with respect to a lengthwise central axis; by an illuminator, emitting light a plurality of times while rotating the predetermined number of secondary batteries; obtaining a plurality of photographed images when light is emitted to the predetermined number of secondary batteries; dividing the plurality of photographed images into individual image sections in which individual secondary batteries are photographed; and generating an inspection image of a single secondary battery by combining the individual image sections according to the photographed images.

Meanwhile, the emitting the light may include emitting light at different positions, the obtaining the photographed image may include obtaining the plurality of photographed images by emitting light at the different positions, and the generating the inspection image may include generating a plurality of inspection images from the plurality of photographed images.

Meanwhile, the obtaining the photographed image may be performed in sync with the emitting the light.

Meanwhile, the emitting the light may include emitting light in sequence at different positions along a lengthwise direction of the picked-up secondary battery.

Further, the emitting the light may include emitting light from a light emitting area formed to have a predetermined length in a direction perpendicular to the lengthwise direction, and the light emitting areas may be sequentially shifted in the lengthwise direction as the photographed image is obtained.

Further, the light emitting areas are set with two areas spaced apart at a predetermined distance in the lengthwise direction.

Further, the emitting the light may include emitting the light obliquely with respect to a direction in which the secondary batteries are picked up and arranged.

Meanwhile, the obtaining the photographed image is performed using a camera having an optical axis oriented perpendicularly to the direction in which the secondary batteries are picked up and arranged.

Further, the picking up the secondary battery may include picking up secondary batteries in a row among the plurality of secondary batteries loaded onto the loader, and moving up the secondary batteries to an inspection position in a lengthwise direction of the secondary battery.

Meanwhile, the method may further include identifying whether appearance is defective based on at least one of brightness and contrast in the inspection image, after generating the inspection image.

BRIEF DESCRIPTION OF THE DRAWINGS

The above and/or other aspects will become apparent and more readily appreciated from the following description of embodiments, taken in conjunction with the accompanying drawings, in which:

FIG. 13 illustrates concept that individual images are combined in an image processor to generate an inspection image;

FIGS. 17A, 17B and 17C illustrate concept that a plurality of inspection images are obtained with respect to one battery in one inspection cycle;

DETAILED DESCRIPTION OF EMBODIMENTS

Figure 1:
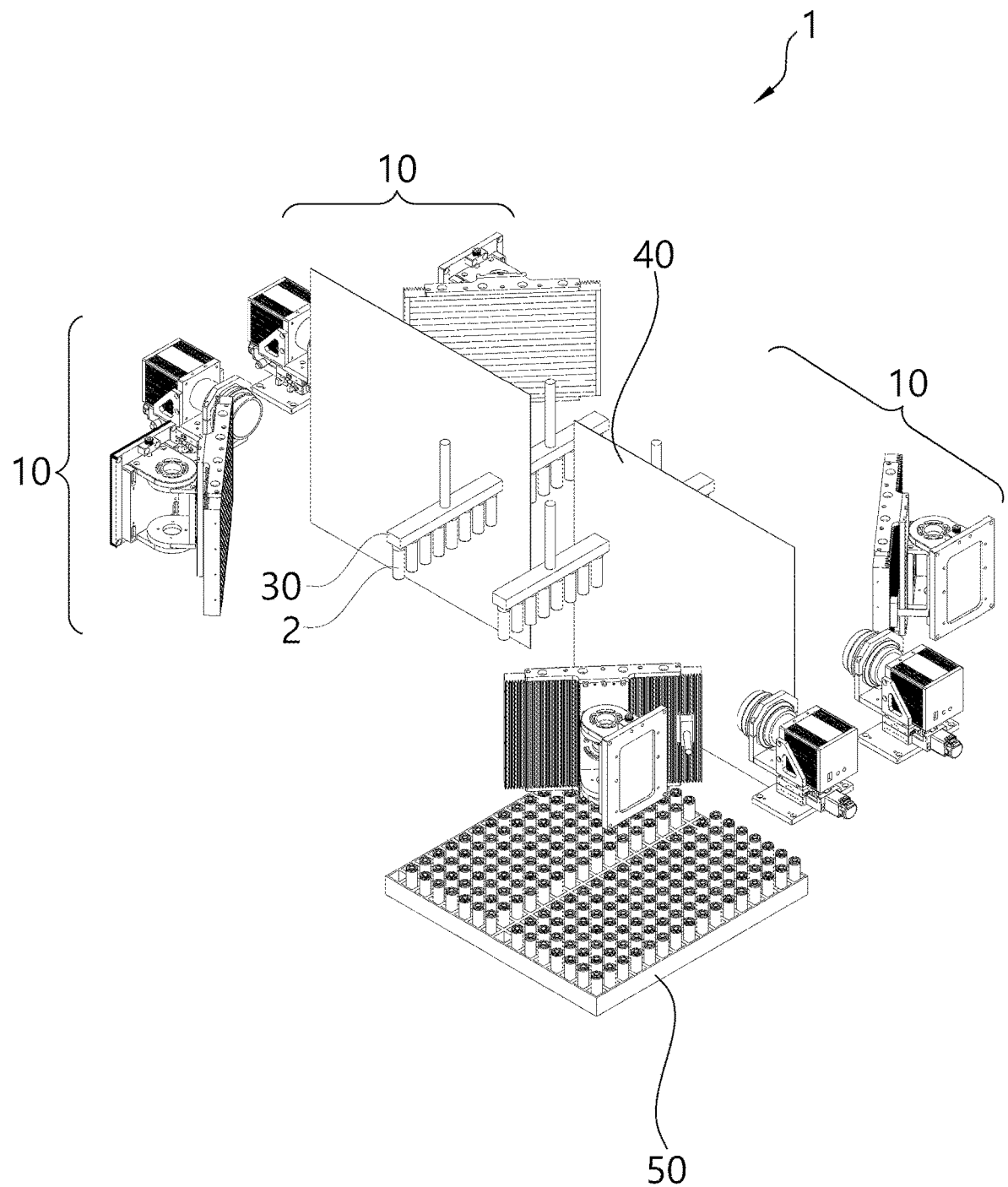
FIG. 1 is a perspective view of an apparatus for inspecting the appearance of a secondary battery according to an embodiment of the disclosure.

Hereinafter, an apparatus and method for inspecting the appearance of a secondary battery according to an embodiment of the disclosure will be described in detail with reference to accompanying drawings. Elements described in embodiments set forth herein may be called other names in the art. However, if the elements are similar or identical in terms of their functions, they may be regarded as equivalents even in alternative embodiments. Further, symbols assigned to the elements are given for convenience of description. However, content on the drawings with these given signs do not limit the elements to a range in the drawings. Likewise, even though the elements on the drawings are partially modified according to alternative embodiments, they having functional similarity and identity may be regarded as equivalents. Further, if those skilled in the art recognizes natural involvement of elements, descriptions of the elements will be omitted.

Hereinafter, it will be described on the premise that the secondary battery has a cylindrical shape of which top and bottom sides are generally shaped like a circle and a lateral surface is curved along the circle. Further, it will be described on the premise that the apparatus is to inspect the lateral surface of the cylindrical secondary battery.

Below, the apparatus for inspecting the appearance of the secondary battery according to the disclosure will be described in detail with reference to FIGS. 1 and 2. In the following description, the configuration and connecting positions of a base, a frame, etc. are generally widely used and variously modifiable, and thus descriptions will be omitted in this regard.

Figure 2:
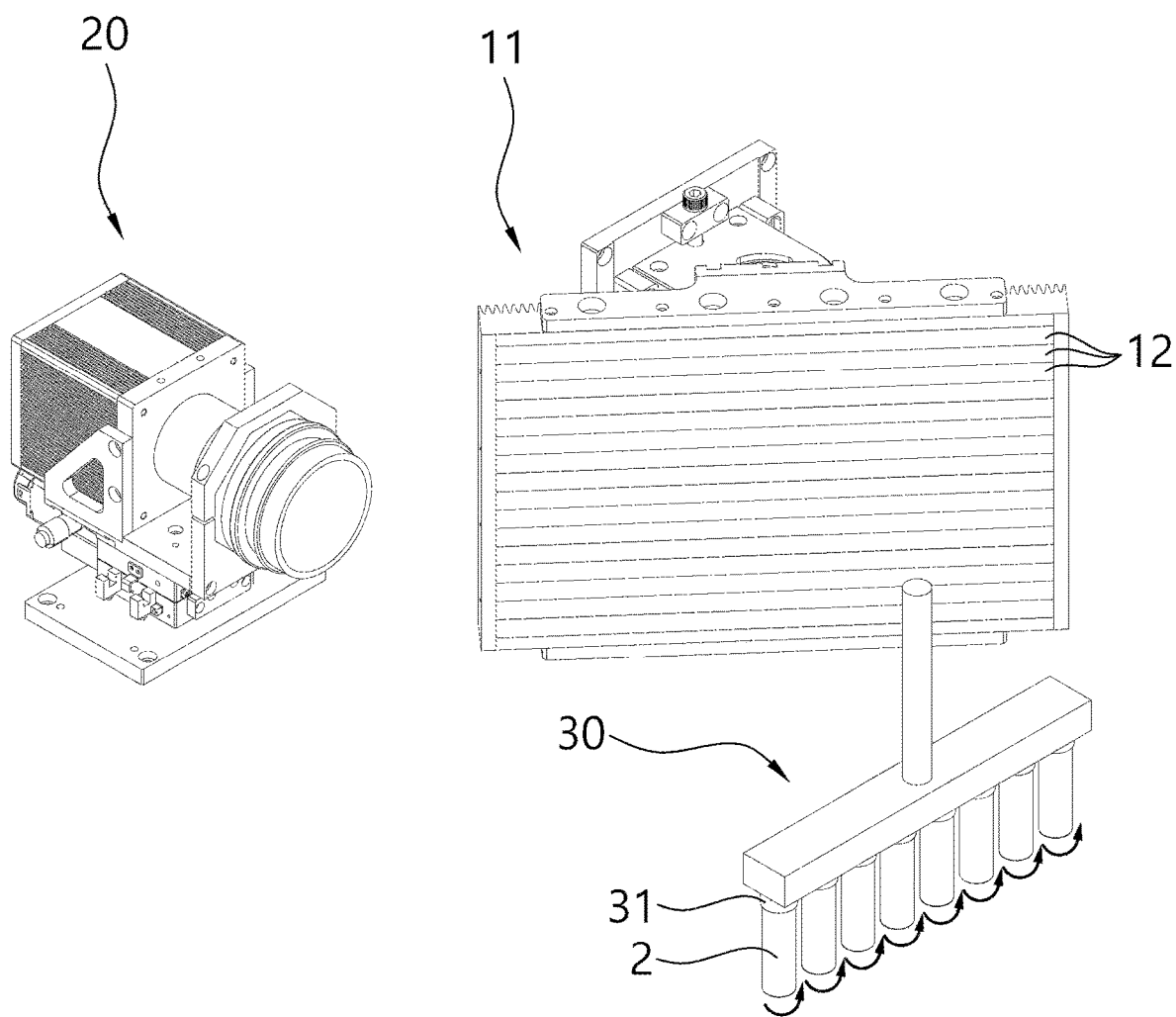
FIG. 2 is a perspective view of an inspection module with respect to an inspection position.

FIG. 1 is a perspective view of an apparatus 1 for inspecting the appearance of a secondary battery according to an embodiment of the disclosure, and FIG. 2 is a perspective view of an inspection module with respect to an inspection position.

Referring to FIG. 1, the apparatus 1 for inspecting the appearance of a secondary battery according to an embodiment of the disclosure may include a transferer (not shown), a hand 30, a blocking plate 40, a lateral-surface inspection module 10, an image processor (not shown), and a controller (not shown).

The transferer is configured to transfer a loader 50 onto which a plurality of secondary batteries 2 are loaded. The transferer may be configured to transfer the loader 50 from the outside, for example, another inspection apparatus to a position where the hand 30 (to be described later) can pick up the secondary battery, or transfer the loader 50 to the outside after the inspection is completed. The transferer may be embodied by a conveyor, a robot arm, or the like widespread element generally used for transferring the loader 50.

The hand 30 may be configured to pick up the plurality of secondary batteries 2. The hand 30 may include a plurality of actuators and guides for three-axial movement. The hand 30 includes a plurality of gripper modules 31 arranged at a lower side thereof to selectively hold the secondary batteries. Each gripper module 31 may be configured to pick up and rotate one side of the secondary battery 2. For instance, the plurality of secondary batteries 2 may be loaded onto the loader 50 in a longitudinal direction, i.e., vertical direction thereof, and the hand 30 may hold an upper portion of the secondary battery 2 with the gripper 31 while moving downward from above the loader 50 and pick up and transfer the secondary battery 2 to the inspection position for inspecting the appearance. Further, the hand 30 may be configured to synchronize the plurality of gripper modules 31 to be simultaneously rotated by the same rotation angle while inspecting the lateral surface of the secondary battery 2. In addition, the hand 30 is configured to return the secondary batteries 2, which have been inspected, to the loader 50. By repetitively performing these operations, the plurality of secondary batteries 2 loaded onto one loader 50 are all subjected to the appearance inspection.

The blocking plate 40 is configured to prevent light interference when a plurality of lateral-surface inspection modules 10 are provided. The blocking plate 40 may be placed between the plurality of lateral-surface inspection modules 10 adjacent to each other. For example, referring back to FIG. 1, the lateral-surface inspection modules 10 may be horizontally disposed at intervals of 90 degrees when they are arranged in an array of 2×2 on a plane. A material, which has the minimum optical transmissivity or prevents light transmittance, may be selected for the blocking plate 40. The blocking plate 40 may be selectively sized suitably for blocking light from an illuminator 11 of the adjacent lateral-surface inspection module 10 within a viewing angle of a camera 20. Meanwhile, the blocking plate 40 may be fastened and connected to a frame, a base or the like external structure, but detailed descriptions thereof will be omitted because such a structure is variously modifiable.

The lateral-surface inspection module 10 may be configured to obtain lateral-surface images of the plurality of secondary batteries 2. The lateral-surface inspection module 10 is configured to obtain the images of the plurality of secondary batteries 2 picked up on one frame in a state that the plurality of secondary batteries 2 are arranged in a row.

The lateral-surface inspection module 10 may include the camera 20 and the illuminator 11. The camera 20 has an appropriate viewing angle, and is placed at a predetermined distance from the inspection position where the secondary battery picked up by the hand 30 is put. The camera 20 may be embodied by an area camera 20 and configured to obtain a photographed image at the inspection position, which includes an image of about half of each secondary battery, in one shot. The camera 20 may be set to have an optical axis perpendicular to a direction in which the secondary batteries are arranged at the inspection position. In other words, the camera 20 may be disposed so that its optical axis can pass through the center of the arrangement of the plurality of secondary batteries.

The illuminator 11 may be configured to emit light to illuminate the plurality of secondary batteries picked up at the same time. The illuminator 11 may include a plurality of light emitting units 12. Each light emitting unit 12 may be formed as extended in a horizontal direction. In other words, a light emitting area in each illuminator 11 may be formed in a direction perpendicular to the lengthwise direction of the picked-up secondary battery. Further, the plurality of light emitting units 12 may be arranged side by side in a vertical direction and configured to operate independently of one another.

The illuminator 11 may be disposed to emit light obliquely with respect to an arrangement direction, in which the secondary batteries are picked up and arranged, so as to appropriately illuminate the secondary batteries 2 without interference with the camera 20. For example, the illuminator 11 may be spaced apart at a predetermined distance from the inspection position, and disposed at an angle of 45 degrees to the midst of the plurality of picked-up secondary batteries 2 arranged in a row. However, such an angle is merely given for example of the description, and the illuminator 11 may alternatively be disposed at various angles.

The image processor (not shown) may be configured to perform inspection by processing the photographed image obtained from the camera 20. The image processor may function to extract each individual partial secondary-battery image from the plurality of obtained photographed images and generate an image of one complete individual secondary battery. In this regard, detailed descriptions will be made later.

The controller (not shown) may be configured to control the camera 20, the hand 30 and the illuminator 11. The controller may be configured to control the position of the hand 30, and the rotation of the gripper module 31. The controller may perform the control by linking the rotation of the gripper module 31, the operation of the camera 20, and the operation of the illuminator 11. The controller controls the gripper module 31 to rotate when the inspection starts, and synchronizes the operation of the illuminator 11 with the operation of the camera 20, thereby controlling the camera 20 to operate and obtain the photographed image when the illuminator 11 operates to illuminate the inspection position. Further, the controller may control the illuminator 11 so that a plurality of light emitting units in the illuminator 11 can emit light as patterned in a predetermined order. However, the controller may be embodied by a generally widespread processor, and therefore detailed descriptions thereof will be omitted.

Below, it will be described with reference to FIGS. 3 to 16 that the camera 20 photographs an inspection image and image processor generates the inspection image.

Figure 3:
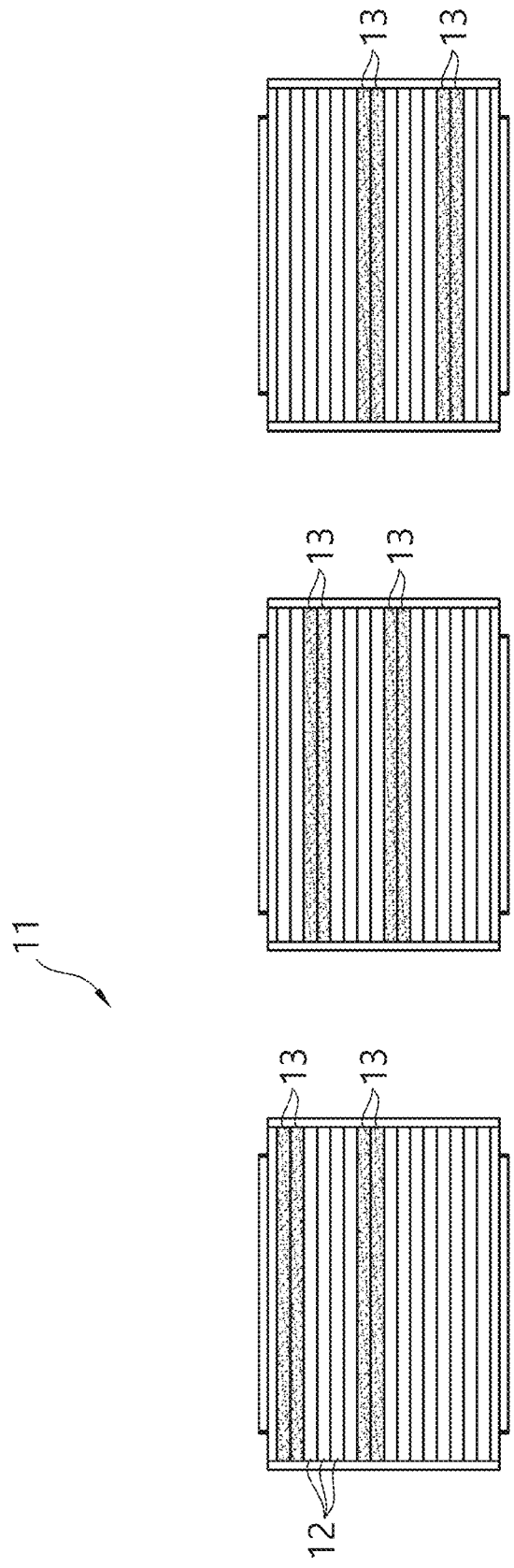
FIG. 3 illustrates an operating state of an illuminator.

FIG. 3 illustrates an operating state of the illuminator 11.

Referring to FIG. 3, as described above, the illuminator 11 may include the plurality of light emitting units 12, and the light emitting units 12 may be arranged parallel to one another in up and down directions. The illuminator 11 may have a light emitting area 13 patterned under control of the controller. For example, as shown in FIG. 3, a first pattern may be formed to generate two rectilinear light emitting areas 13 parallel to each other by simultaneously operating the topmost light emitting module and a light emitting module spaced downward apart at a predetermined distance from the topmost light emitting module. A second pattern may be formed to generate a pair of rectilinear light emitting areas 13 parallel to each other in a horizontal direction, in which the positions of the selected light emitting units are shifted downward from those of the first pattern. A third pattern may be formed to generate light emitting areas 13 by selecting the light emitting units, the positions of which are shifted downward from those of the second pattern. In this way, the illuminator 11 emits light while shifting the light emitting positions in a vertical direction, so that the light emitting positions can be shifted along the longitudinal directions of the picked-up secondary batteries, i.e., in the vertical direction, thereby making it easy to detect a defective appearance.

FIGS. 4 to 12 illustrate concept that the illuminator 11, the hand 30 and the camera 20 are used to obtain photographed images.

In each of FIGS. 4 to 12, the lateral surface (shown at the top of each figure) of the picked-up secondary battery, the light emitting position (shown in the middle of each figure) of the illuminator 11, and a conceptual diagram (shown at the bottom of each figure) of the photographed image are illustrated so as to identify the rotation angles of the secondary battery. In the following drawings, it will be described on the premise that the plurality of secondary batteries are arranged in a row and picked up by the hand 30 and then placed at the inspection position. Further, it will be described by way of example that the number of secondary batteries to be inspected by the foregoing lateral-surface inspection module 10 is eight. The photographed image shows a first secondary battery 1A, a second secondary battery 2A, a third secondary battery 3A, a fourth secondary battery 4A, a fifth secondary battery 5A, a sixth secondary battery 6A, a seventh secondary battery 7A, and an eighth secondary battery 8A from left, which are arranged side by side.

Figure 4:
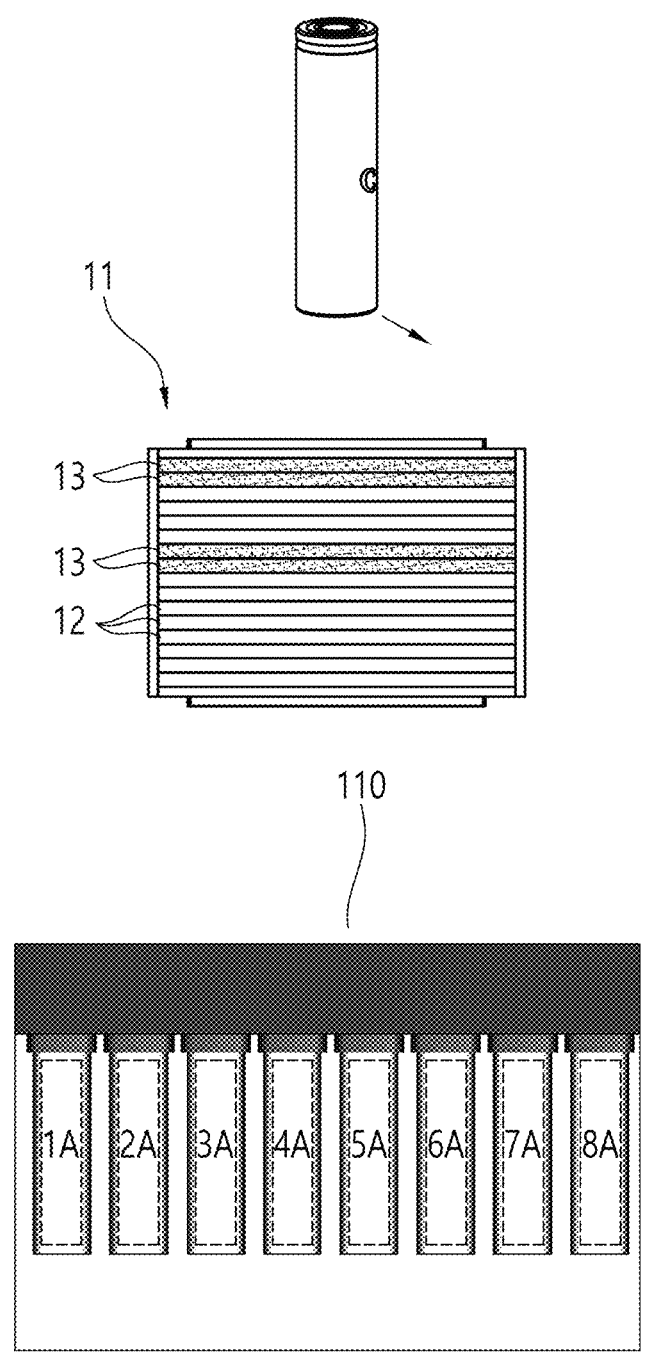
FIGS. 4 to 12 illustrate concept that an illuminator, a hand and a camera are used to obtain photographed images.

First, referring to FIG. 4, the controller starts rotating eight picked-up secondary batteries. When the rotation starts or before the rotation starts, the illuminator 11 selects the light emitting areas 13 based on the first pattern to illuminate the inspection position. At this time, the camera 20 obtains a first photographed image 110 showing each half of eight secondary batteries.

Figure 5:
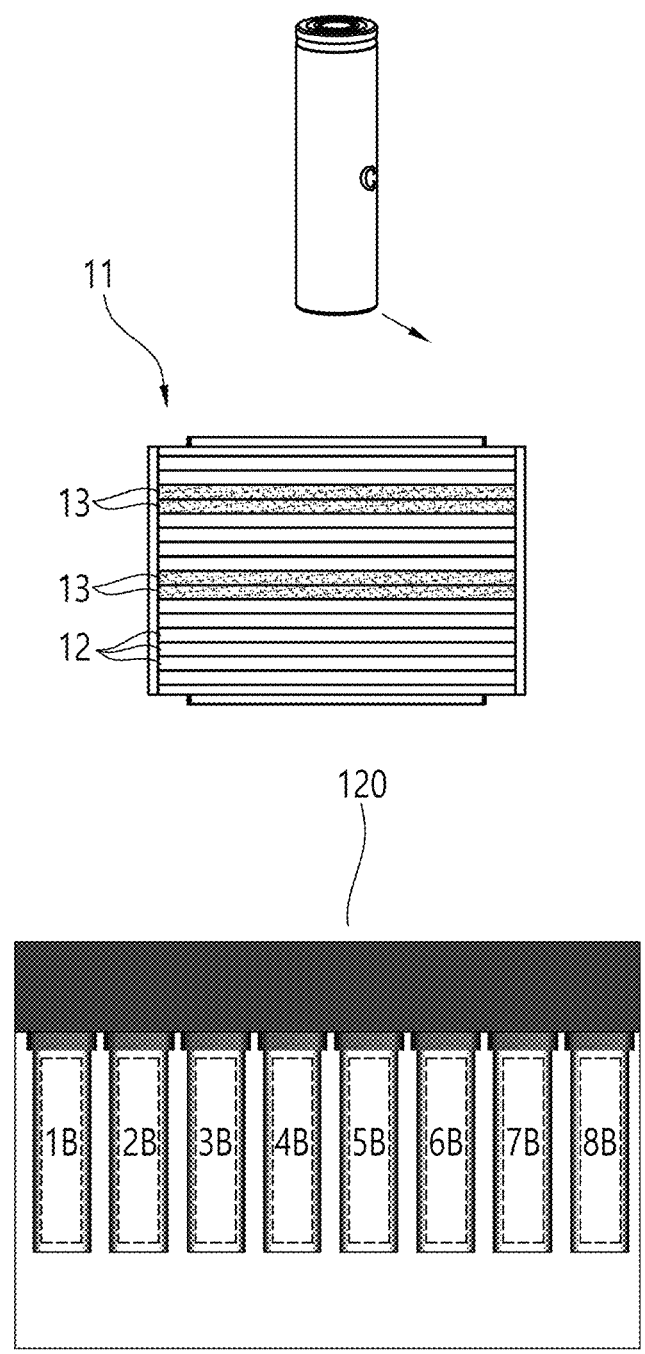

Next, referring to FIG. 5, after obtaining the first photographed image 110, the controller shifts the illuminator 11 from the first pattern to the second pattern to select the light emitting areas 13 and emit light, thereby obtaining a second photographed image 120. Even in the second image, it is possible to identify images of first to eighth secondary batteries 1B to 8B.

Figure 6:
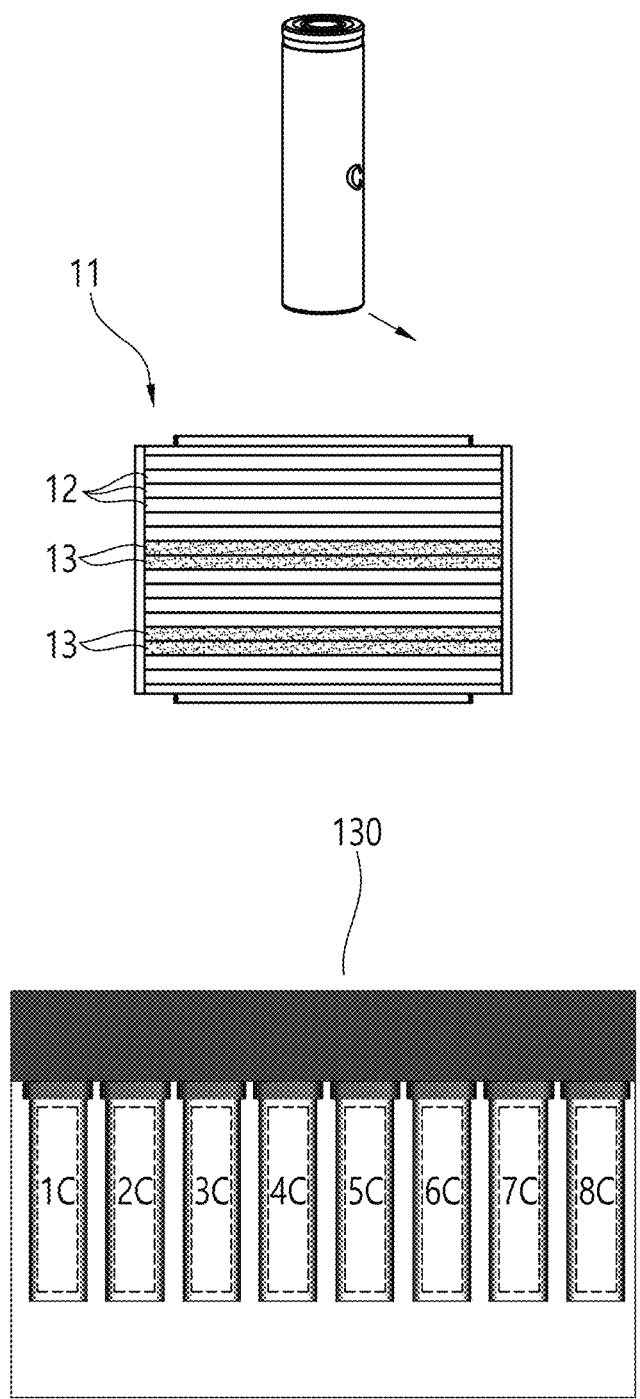
Figure 7:
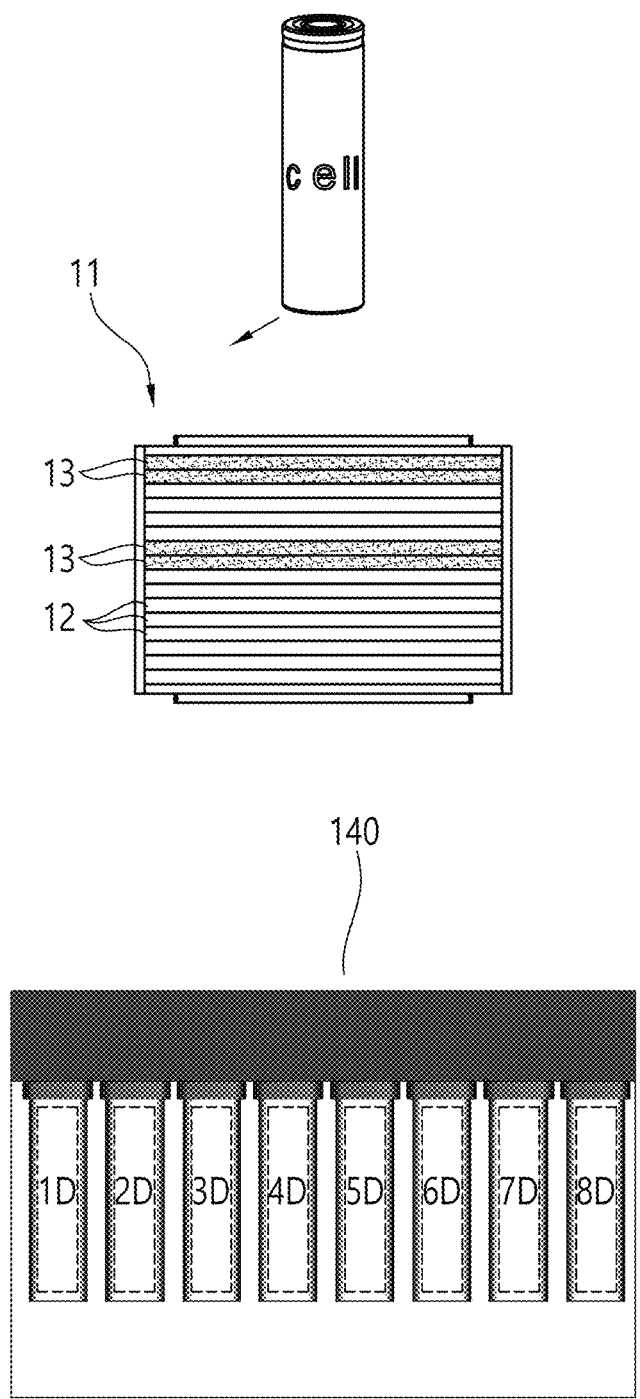
Figure 8:
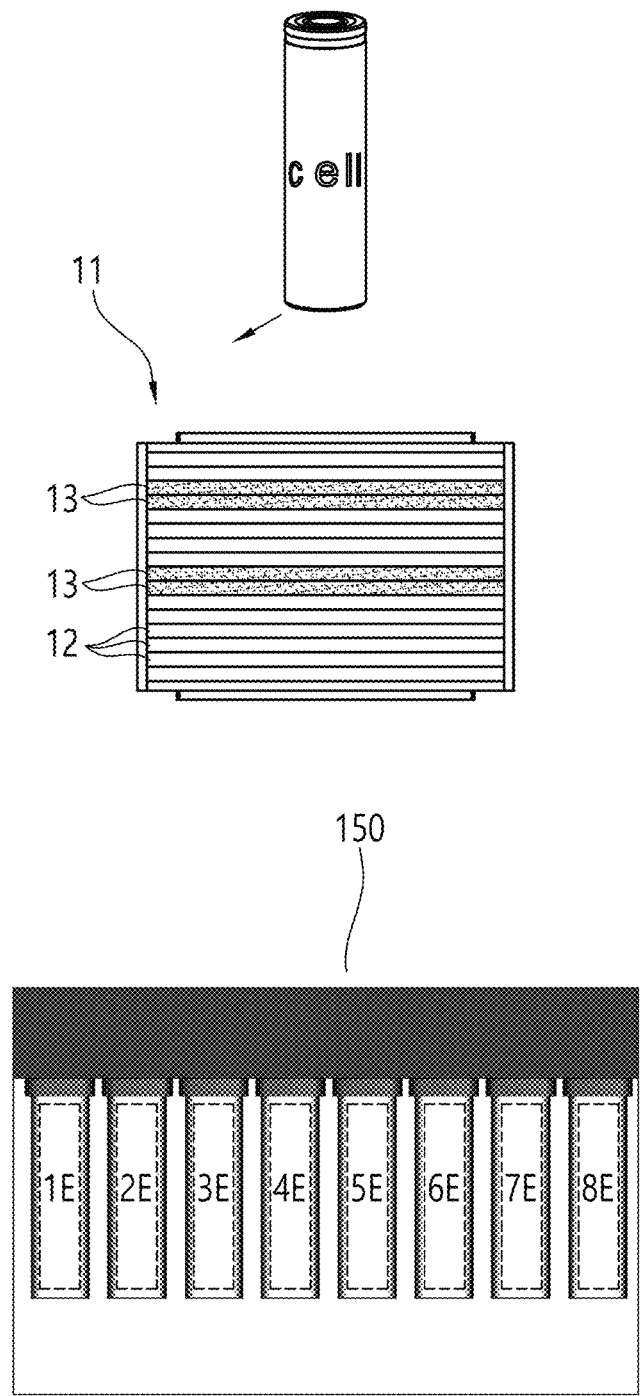
Figure 9:
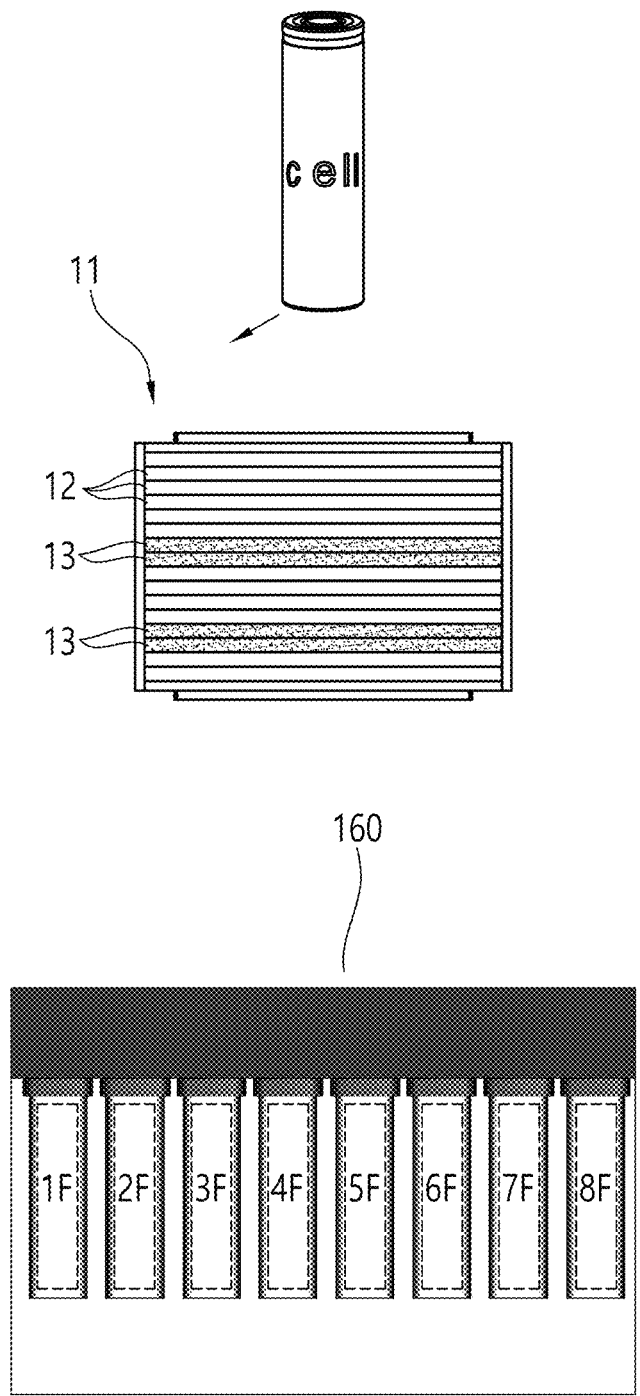

Next, referring to FIG. 6, after obtaining the second photographed image 120, the controller shifts the illumination pattern of the illuminator 11 from the second pattern to the third pattern and obtains a third photographed image 130 while emitting light. Even in the third image, it is possible to identify images of first to eighth secondary batteries 1C to 8C.

Meanwhile, such image photographing operations described with reference to FIGS. 4 to 6 may be performed at time intervals of several ms or μs. On the other hand, the rotation speed of the gripper module 31 is relatively low. Therefore, even though the first to third photographed images 110 to 130 are taken while the secondary batteries are being rotated by the gripper module 31, the areas of the first to third photographed images 110 to 130 are almost the same as if the images are photographed in the state that the secondary batteries are substantially stationary.

Then, the controller operates the gripper module 31 to rotate, thereby turning the plurality of picked-up secondary batteries at a predetermined angle. For example, the predetermined angle may be 120 degrees. When the cylindrical secondary battery is photographed as a planar image, it is difficult to obtain an accurate outer-edge image of the cylinder due to the limitation of the viewing angle. Therefore, the image needs to be obtained by moving the cylinder as much as an area where an accurate image can be obtained. In other words, the photographed image is an image of 180 degrees, which shows about half of the secondary battery, but an outer-edge image in the photographed image makes it difficult to accurately inspect the secondary battery. Accordingly, three 120-degree images of the secondary battery are taken to reconstruct the entire image. However, this is merely an example. To increase the accuracy, the photographing positions for the secondary battery may be adjusted based on rotation angles. For example, the secondary battery may be photographed as rotated at intervals of 90 degrees, or, more frequently, at intervals of 60 degrees, 45 degrees or 30 degrees. Below, it will be described that the lateral-surface image of the secondary battery is obtained three times by rotating the secondary battery at an angle of 120 degrees.

Referring back to FIGS. 7 and 9, the secondary battery is clockwise rotated 120 degrees, and then photographed with illumination based on the first, second and third patterns like those described with reference to FIGS. 4 to 6, thereby obtaining a fourth photographed image 140, a fifth photographed image 150, and a sixth photographed image 160.

Figure 10:
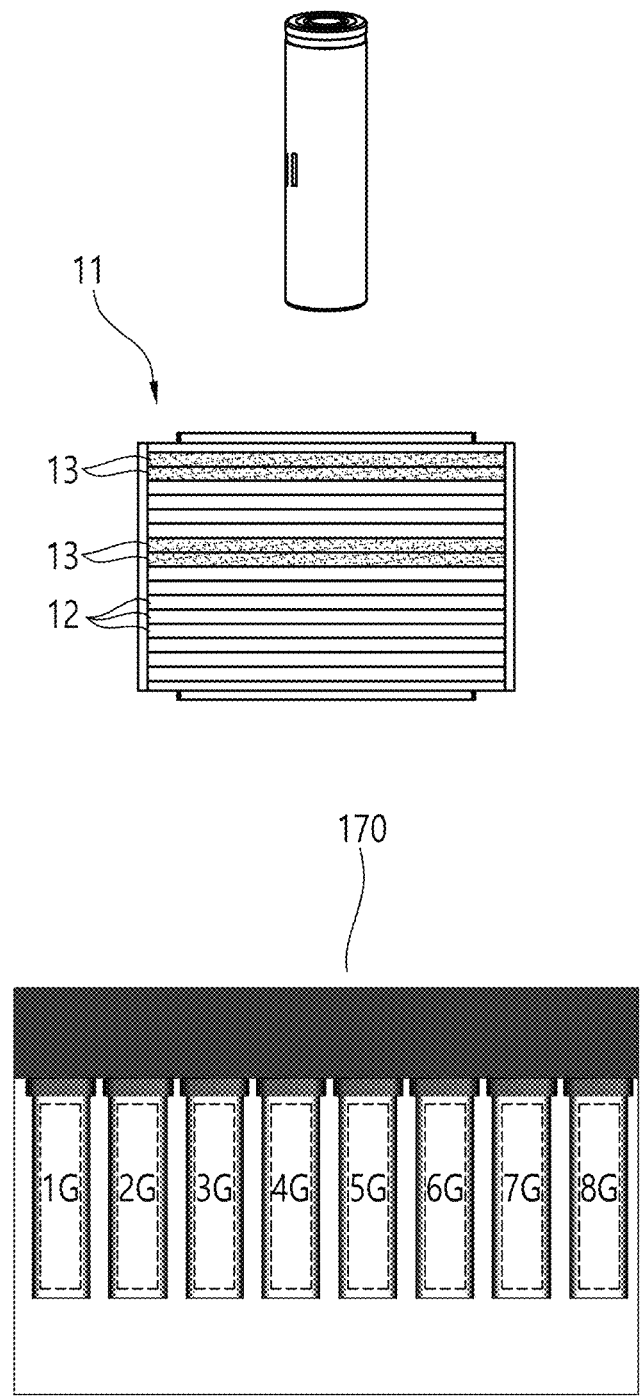
Figure 11:
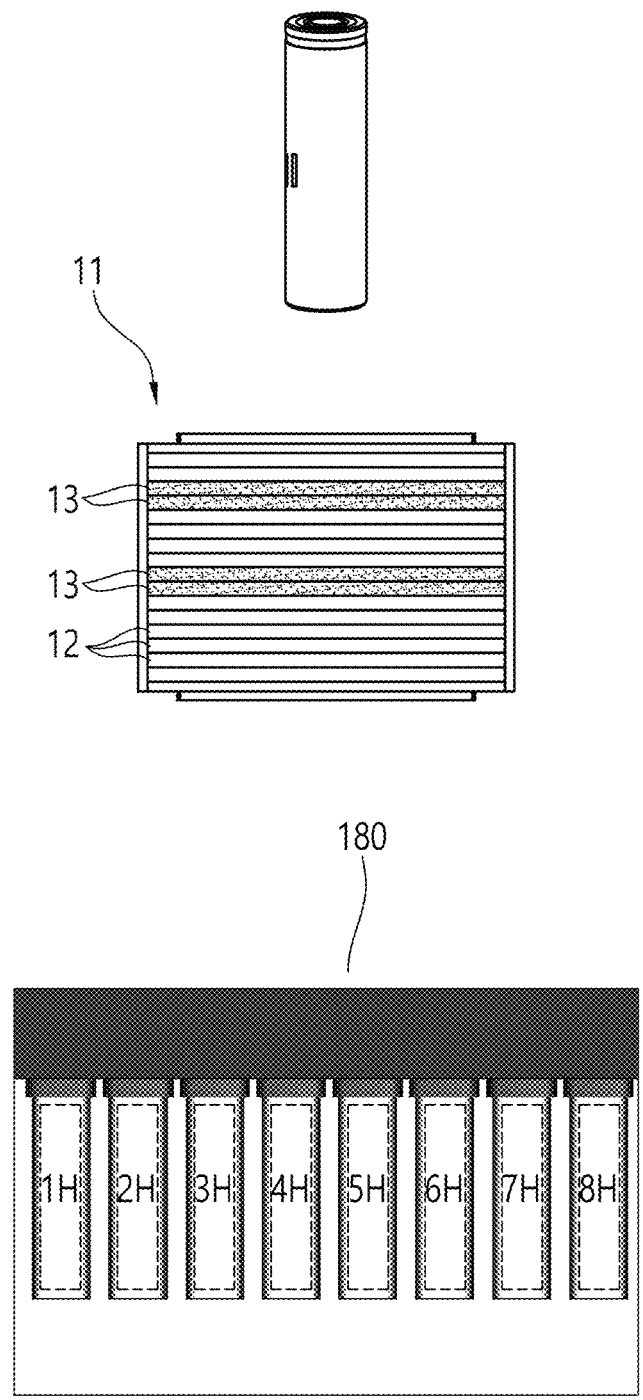
Figure 12:
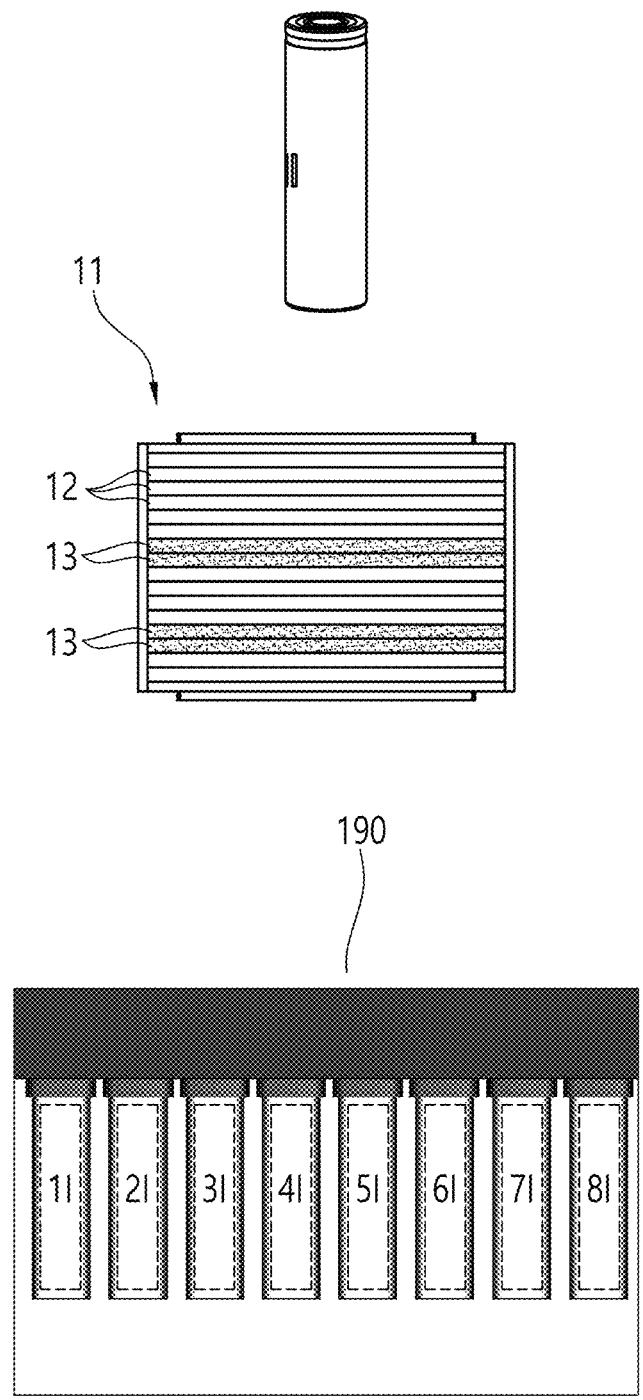

Next, referring to FIGS. 10 to 12, the gripper module 31 operates to further rotate each of the plurality of secondary batteries 120 degrees, and a seventh photographed image 170, an eighth photographed image 180 and a ninth photographed image 190 are obtained by changing the illumination pattern as described above.

Meanwhile, the foregoing operation, i.e., shifting operation of the illuminator 11 is for example performed among three patterns such as the first pattern, the second pattern and the third pattern. Alternatively, the number of patterns may be decreased or increased. For example, the illuminator 11 may have four patterns and the four patterns may be shifted downward. In this case, the inspection image may be based on as many photographed images as the number of patterns with respect to each rotated position of the secondary battery.

Below, the image processor's function of generating the inspection image will be described with reference to FIGS. 13 to 16.

Figure 14:
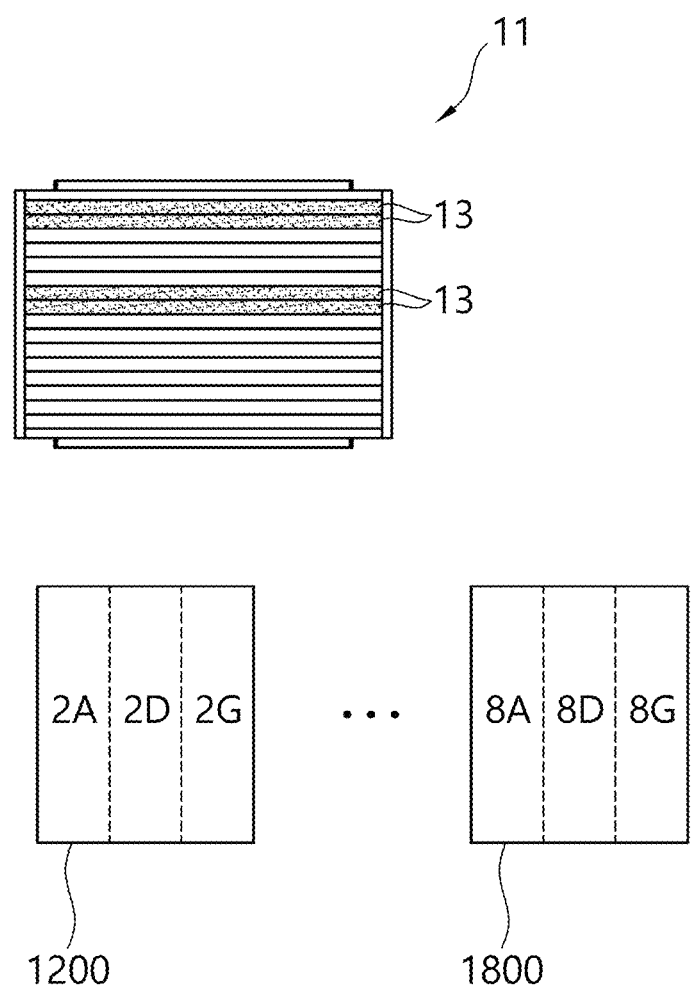
FIGS. 14 to 16 illustrate concept that a plurality of inspection images are obtained based on the same pattern of illumination.
Figure 15:
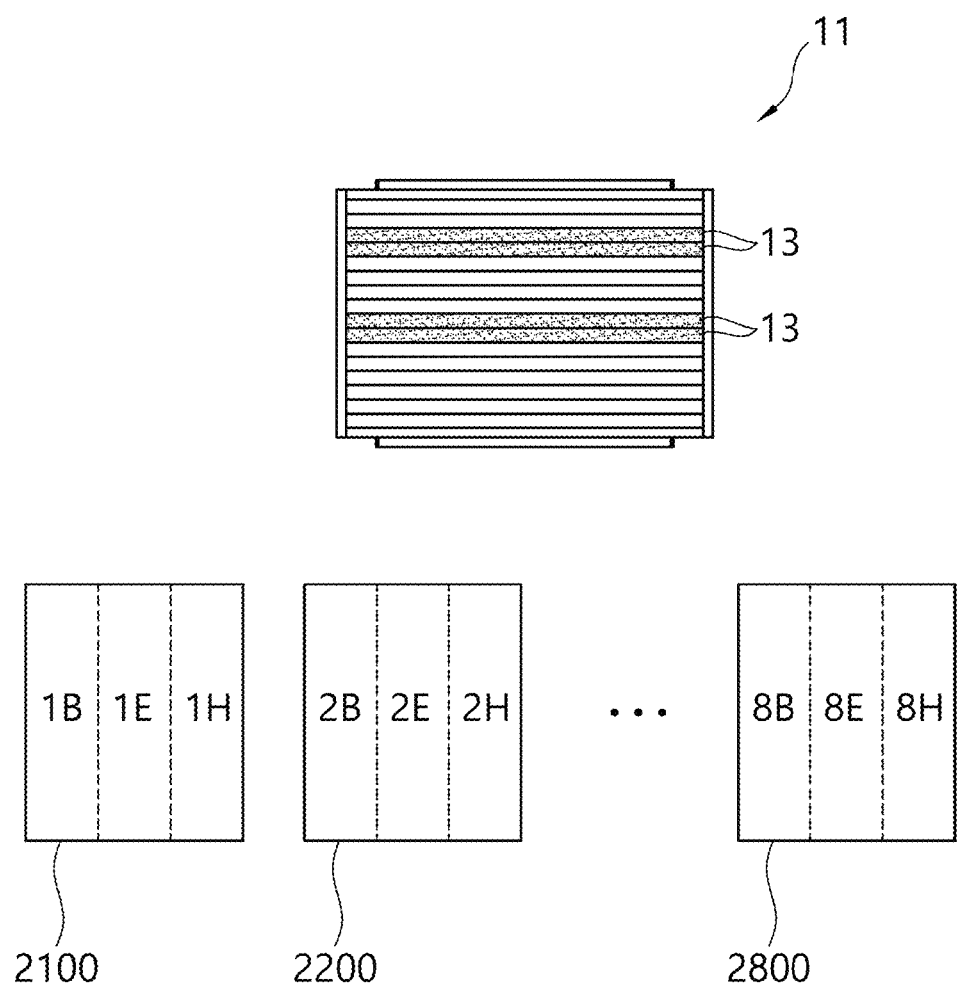
Figure 16:
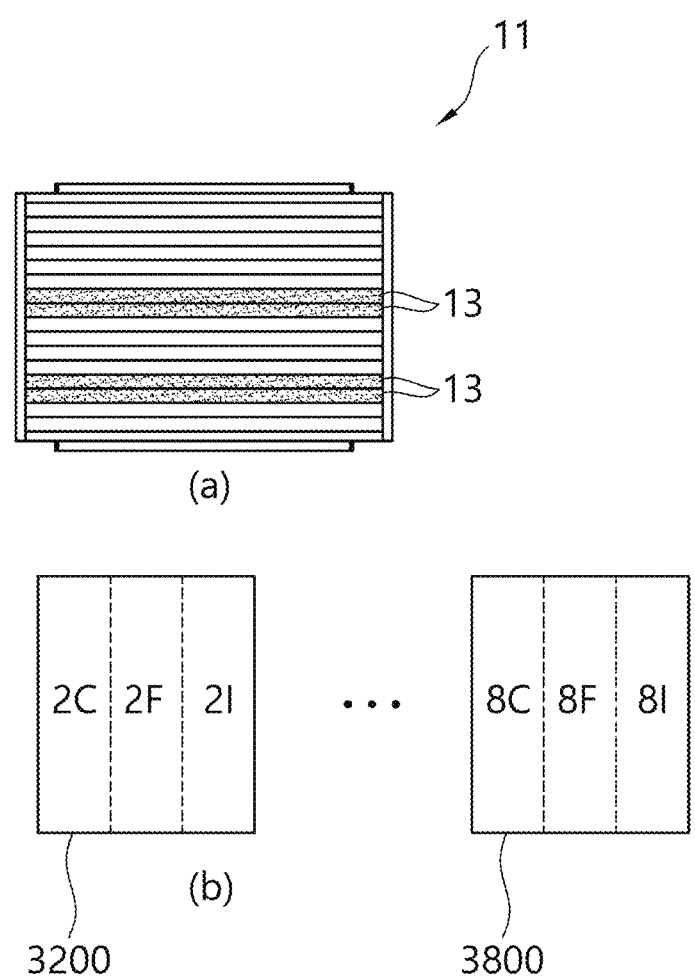

FIG. 13 illustrates concept that individual images are combined in an image processor to generate an inspection image, and FIGS. 14 to 16 illustrate concept that a plurality of inspection images are obtained based on the same pattern of illumination.

Referring to FIG. 13, the image processor may receive the photographed images obtained in the camera 20 under the operating conditions of a specific light emitting module (shown at the top of FIG. 14, 15, 16) and then generate the inspection image (shown at the bottom of FIG. 14, 15, 16). Each photographed image may include an image obtained with respect to partial lateral-surfaces of a plurality of secondary batteries. In this case, predetermined areas adjacent to both edges in the photographed image is hardly inspected through their images, and therefore an image is extracted within a predetermined area around an axis of left and right symmetry except the predetermined area adjacent to the edges. The image processor extracts an individual image section 200, in which the secondary batteries are photographed, on the photographed image shown in one frame. The image processor performs extraction of the individual image section 200 from all the photographed images 110, 120, 130, 140, 150, 160, 170, 180 and 190. Therefore, the extracted individual image section is based on the number of photographed images×the number of picked-up secondary batteries.

In case of the foregoing example described with reference to FIGS. 4 to 12, the image processor may extract seventy-two individual image sections.

Next, the image processor combines and synthesizes the images according to illumination patterns, individual secondary batteries, and rotation angles. Referring to FIG. 13, the images of the first secondary battery photographed based on the first pattern include an image 1A at a rotation angle of 0 degrees, an image 1D at a rotation angle of 120 degrees and an image 1G at a rotation angle of 240 degrees, which are combined in sequence to generate an inspection image 1100 of the first secondary battery based on the first pattern.

Referring to FIG. 14, the foregoing generation of the inspection image is applied to the first to eighth secondary batteries, thereby generating eight inspection images photographed by selecting the light emitting areas 13 based on the first pattern. For convenience of description, FIG. 14 shows a first secondary-battery inspection image 1100 based on the first pattern, a second secondary-battery inspection image 1200 based on the first pattern, and an eighth secondary-battery inspection image 1800 based on the first pattern.

Referring to FIG. 15, inspection images of respective secondary batteries are illustrated, which are generated when the light emitting areas 13 of the illuminator 11 are selected to emit light based on the second pattern. For convenience of description, FIG. 15 shows a first secondary-battery inspection image 2100 based on the second pattern, a second secondary-battery inspection image 2200 based on the second pattern, and an eighth secondary-battery inspection image 2800 based on the second pattern.

Referring to FIG. 16, inspection images of respective secondary batteries are illustrated, which are generated when the light emitting areas 13 of the illuminator 11 are selected to emit light based on the third pattern. For convenience of description, FIG. 16 shows a first secondary-battery inspection image 3100 based on the third pattern, a second secondary-battery inspection image 3200 based on the third pattern, and an eighth secondary-battery inspection image 3800 based on the third pattern.

FIGS. 17A, 17B and 17C illustrate concept that a plurality of inspection images are obtained with respect to one battery in one inspection cycle Referring to FIGS. 17A, 17B and 17C, three inspection images generated with respect to the first secondary battery are illustrated. For understanding, both the pattern of the illuminator 11 and the obtained inspection image are illustrated together.

FIG. 17A shows the first secondary-battery inspection image 1100 based on the first pattern, FIG. 17B shows the first secondary-battery inspection image 2100 based on the second pattern, and FIG. 17C shows the first secondary-battery inspection image 3100 based on the third pattern. Ultimately, the individual image sections of each secondary battery are extracted from the photographed image, and combined to obtain the completed inspection image of the entire lateral surface. Further, the inspection images are obtained when light is emitted while shifting the illumination patterns.

Thus, the image processor can inspect the appearance of each secondary battery.

The foregoing apparatus 1 for inspecting the appearance of the secondary battery according to the disclosure obtains images of the plurality of secondary batteries through the area camera 20, and generates the inspection images based on the illumination pattern to perform appearance inspection, thereby significantly improving inspection speed. Further, as shown in FIG. 1, a plurality of appearance inspection modules are arranged to maximize the inspection speed.

Below, a method of inspecting the appearance of the secondary battery according to another embodiment of the disclosure will be described in detail with reference to FIG. 18.

Figure 18:
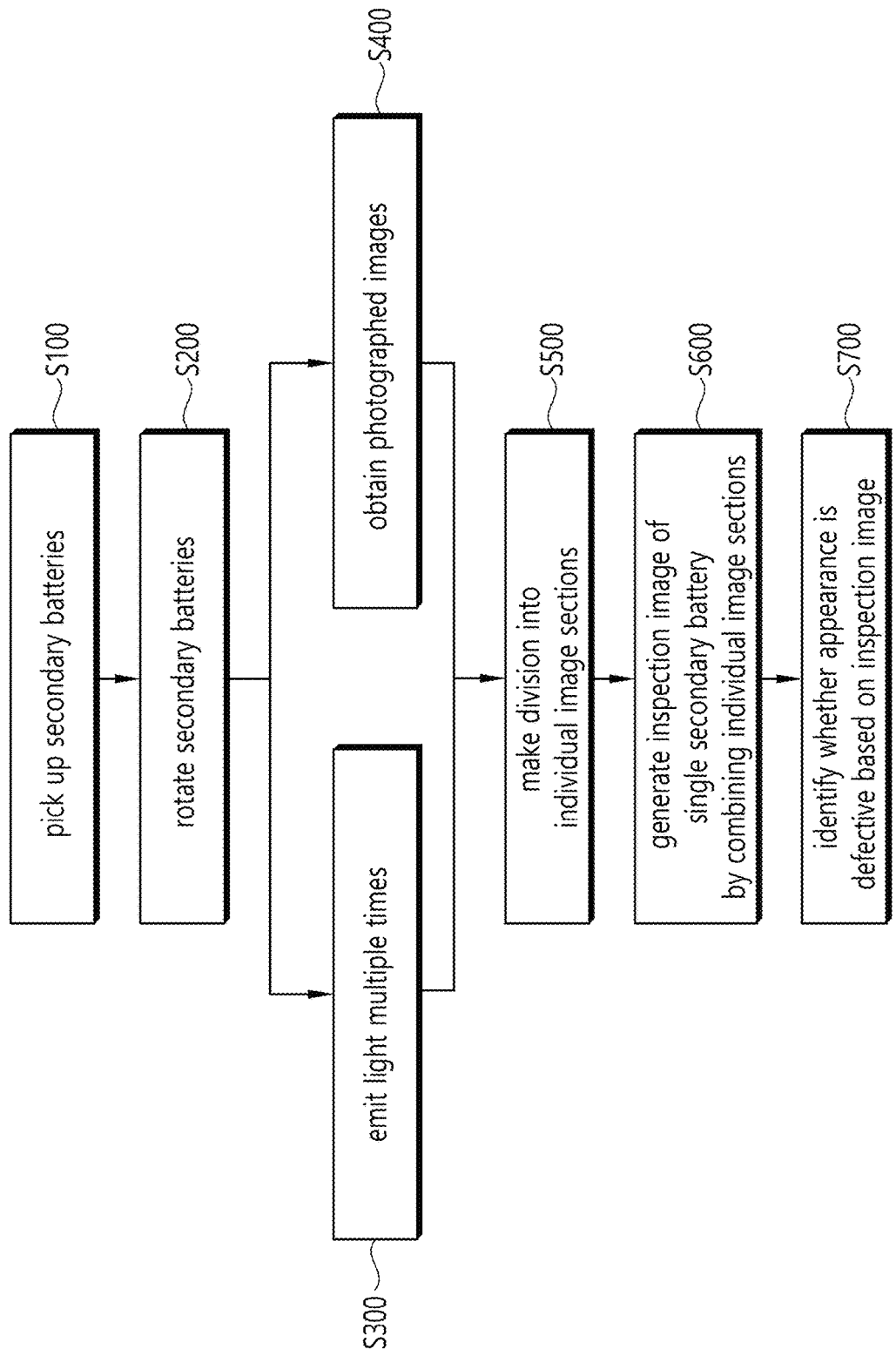
FIG. 18 is a flowchart of a method of inspecting the appearance of a secondary battery according to another embodiment of the disclosure.

FIG. 18 is a flowchart of a method of inspecting the appearance of a secondary battery according to another embodiment of the disclosure.

Referring to FIG. 18, the method of inspecting the appearance of the secondary battery according to another embodiment of the disclosure may include operation S100 of picking up the secondary battery, operation S200 of rotating the secondary battery, operation S300 of emitting light a plurality of times, operation S400 of obtaining a plurality of photographed images, operation S500 of dividing an individual image section, operation S600 of generating an inspection image of the single secondary battery by combining the plurality of individual image sections, and operation S700 of identifying whether the appearance is defective based on the inspection image.

The operation S100 of picking up the secondary battery refers to operation of picking up the secondary batteries as many as a unit number of inspection among the plurality of secondary batteries transferred from the outside. In this operation, the hand provided in the inspection apparatus for the secondary battery may approach and pick up the plurality of secondary batteries in the lengthwise direction, i.e., the longitudinal direction of the secondary battery. In this case, spaces between the secondary batteries picked up in a row may be adjusted for the inspection.

The operation S200 of rotating the secondary battery refers to operation of rotating a predetermined number of picked-up secondary batteries with respect to their own central axes. This operation may rotate the secondary battery more than one revolution, i.e., 360 degrees.

The operation S300 of emitting light a plurality of times refers to operation of illuminating the plurality of rotated secondary batteries. In this operation, as described with reference to FIG. 3, the light emitting areas of the illuminator 11 may be shifted while light is emitted. In this case, the light emitting areas may be shifted from an upper side toward a lower side.

The operation S400 of obtaining a plurality of photographed images refers to operation of obtaining images of the plurality of secondary batteries through the camera 20 in sync with the operation of emitting light. In other words, the plurality of photographed images are obtained when the plurality of secondary batteries are illuminated with light emitted from different areas.

Meanwhile, the operation S300 of emitting light a plurality of times and the operation S400 of obtaining a plurality of photographed images may be simultaneously performed as synchronized according to rotated angles of the secondary battery. For example, these operations S300 and S400 may be performed when the plurality of secondary batteries are disposed at an initial position and whenever the plurality of secondary batteries are rotated 120 degrees. However, such a photographing angle is merely given by way of example, and may include various angles such as 10 degrees, 30 degrees, 45 degrees, 60 degrees, and 90 degrees. Further, the number of photographing times may vary.

The operation S500 of dividing an individual image section refers to operation of divisionally extracting an area of each secondary battery from the photographed image obtained based on illumination. Each divided individual image section may be stored together with information about the illumination pattern and information about the corresponding secondary battery.

The operation S600 of generating an inspection image of the single secondary battery by combining the plurality of individual image sections refers to operation of classifying photographed images according to the secondary batteries, the illumination patterns and the rotated angles, and sorting and combining the photographed images in sequence corresponding to the same secondary battery, the same illumination pattern and the rotated angle. This operation is performed to generate the inspection image based on the entire lateral-surface images obtained when the secondary battery is illuminated according to the illumination patterns.

The operation S700 of identifying whether the appearance is defective based on the inspection image refers to operation of identifying whether the appearance is defective based on the plurality of obtained inspection images by extracting at least one of brightness and contrast. In other words, the flatness of the lateral surface of the secondary battery is identified to thereby detect and store abnormal appearance defects such as a dent, a protrusion, a scratch, etc. The secondary batteries, which have been inspected, are transferred to the outside, and then the inspection for new secondary batteries will be repeated.

The foregoing method of inspecting the appearance of the secondary battery may be carried out by the appearance inspection apparatus described with reference to FIGS. 1 to 17.

As described above, the apparatus and method for inspecting the appearance according to the disclosure can perform inspection by simultaneously obtaining the inspection images of the multiple secondary batteries through the area camera, thereby having an effect on maximizing the inspection efficiency.

According to the disclosure, the apparatus and method for inspecting the appearance can perform inspection by simultaneously obtaining the inspection images of the multiple secondary batteries through the area camera, thereby having an effect on maximizing the inspection efficiency.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. An apparatus for inspecting appearance of a secondary battery, the apparatus comprising:
    a hand configured to simultaneously rotate a plurality of secondary batteries arranged in a lateral direction;
    an illuminator configured to emit light to the plurality of secondary batteries at a time;
    a camera configured to obtain a photographed image in which the plurality of secondary batteries are shown when the light is emitted to the plurality of secondary batteries;
    an image processor configured to obtain an inspection image by processing the image obtained by the camera; and
    a controller configured to control the photographing of the camera and the light emission of the illuminator to be synchronized,
    wherein the image processor divides the photographed image obtained by the camera into individual image sections where the secondary batteries are respectively photographed,
    wherein each individual image section is an area where one secondary battery is shown,
    wherein the inspection image is generated by combining the individual image sections according to the photographed images of one secondary battery,
    wherein the illuminator comprising a plurality of light emitting units configured to emit light at different positions,
    wherein the controller is configured to select and control a sequence of operating the light-emitting units positioned at different positions along a lengthwise direction of the secondary battery which is being held by the hand, and
    wherein the image processor obtains a plurality of inspection images captured by the camera, with light emission from distinct light-emitting units among the plurality of light-emitting units.

2. The apparatus according to claim 1, wherein the controller is configured to:
    simultaneously operate the plurality of light emitting units disposed along a pair of straight lines spaced apart from each other and perpendicular to the lengthwise direction, and
    control the operating light emitting units to be switched along the lengthwise direction.

3. The apparatus according to claim 2, wherein the illuminator is disposed to emit light obliquely with respect to an arrangement direction in which a predetermined number of picked-up secondary batteries are arranged.

4. The apparatus according to claim 3, wherein the camera comprises an optical axis perpendicular to the arrangement direction in which the predetermined number of picked-up secondary batteries are arranged.

5. The apparatus according to claim 2, wherein the hand is configured to pick up and move a predetermined number of secondary batteries in the lengthwise direction from a loader, in which the plurality of secondary batteries are loaded, to an inspection position.

6. The apparatus according to claim 1, wherein the image processor is configured to identify whether appearance is defective based on at least one of brightness and contrast in the plurality of inspection images.

7. A method of inspecting appearance of a secondary battery, the method comprising:
    by a hand, picking up a predetermined number of secondary batteries arranged in a row from a loader in which a plurality of secondary batteries are loaded;
    simultaneously rotating the predetermined number of secondary batteries with respect to a lengthwise central axis;
    by an illuminator, emitting light a plurality of times while rotating the predetermined number of secondary batteries;
    obtaining a plurality of photographed images in which the predetermined number of secondary batteries are shown when light is emitted to the predetermined number of secondary batteries;
    dividing each of the plurality of photographed image into individual image sections, wherein an individual secondary battery is photographed in a respective one of the individual image sections; and
    generating an inspection image of a single secondary battery by combining the individual image sections according to the photographed images,
    wherein the obtaining the plurality of photographed images is synchronized with sequential emission of light at different positions along a lengthwise direction of the picked-up secondary battery, and
    wherein the generating the inspection image comprises generating a plurality of inspection images from the plurality of photographed images.

8. The method according to claim 7, wherein
    the emitting the light comprises emitting light from a light emitting area formed to have a predetermined length in a direction perpendicular to the lengthwise direction, and
    the light emitting areas are sequentially shifted in the lengthwise direction as the photographed image is obtained.

9. The method according to claim 8, wherein the light emitting areas are set with two areas spaced apart at a predetermined distance in the lengthwise direction.

10. The method according to claim 7, wherein the emitting the light comprises emitting the light obliquely with respect to a direction in which the secondary batteries are picked up and arranged.

11. The method according to claim 10, wherein the obtaining the photographed image is performed using a camera having an optical axis oriented perpendicularly to the direction in which the secondary batteries are picked up and arranged.

12. The method according to claim 7, wherein the picking up the secondary battery comprises picking up secondary batteries in a row among the plurality of secondary batteries loaded onto the loader, and moving up the secondary batteries to an inspection position in a lengthwise direction of the secondary battery.

13. The method according to claim 7, further comprising identifying whether appearance is defective based on at least one of brightness and contrast in the inspection image, after generating the inspection image.

\* \* \* \* \*